United States Patent
Bergman et al.

(10) Patent No.: US 10,301,951 B2
(45) Date of Patent: May 28, 2019

(54) TURBINE VANE GUSSET

(71) Applicant: United Technologies Corporation, Farmington, CT (US)

(72) Inventors: Russell J. Bergman, Windsor, CT (US); Jeffrey Michael Jacques, East Hartford, CT (US); Daniel Belotto, Palm Beach Gardens, FL (US)

(73) Assignee: United Technologies Corporation, Farmington, CT (US)

( * ) Notice: Subject to any disclaimer, the term of this patent is extended or adjusted under 35 U.S.C. 154(b) by 415 days.

(21) Appl. No.: 15/160,216

(22) Filed: May 20, 2016

(65) Prior Publication Data

US 2017/0335698 A1 Nov. 23, 2017

(51) Int. Cl.
| | |
|---|---|
| *F01D 9/02* | (2006.01) |
| *F01D 11/00* | (2006.01) |
| *F01D 25/24* | (2006.01) |
| *F02C 3/04* | (2006.01) |

(52) U.S. Cl.
CPC .............. *F01D 9/02* (2013.01); *F01D 11/005* (2013.01); *F01D 25/24* (2013.01); *F01D 25/246* (2013.01); *F02C 3/04* (2013.01); *F05D 2220/32* (2013.01); *F05D 2240/12* (2013.01); *F05D 2240/55* (2013.01); *F05D 2250/14* (2013.01)

(58) Field of Classification Search
CPC ........ F01D 9/02; F01D 11/005; F01D 25/246; F02C 3/04; F05D 2220/32; F05D 2240/12; F05D 2240/55; F05D 2250/14
See application file for complete search history.

(56) References Cited

U.S. PATENT DOCUMENTS

| | | | | |
|---|---|---|---|---|
| 3,365,173 | A * | 1/1968 | Lynch ..................... | F01D 9/042 415/209.2 |
| 5,007,800 | A * | 4/1991 | Hacault .................. | F01D 5/225 416/191 |
| 5,018,941 | A * | 5/1991 | Heurtel ................... | F01D 5/303 416/217 |
| 5,131,813 | A * | 7/1992 | Przytulski ................ | F01D 5/03 416/217 |
| 5,131,814 | A * | 7/1992 | Przytulski ............. | F01D 5/3007 416/193 A |
| 5,188,507 | A * | 2/1993 | Sweeney .................. | B23H 9/10 415/170.1 |

(Continued)

FOREIGN PATENT DOCUMENTS

| | | |
|---|---|---|
| FR | 2953252 A1 | 6/2011 |
| WO | 2015/187164 A1 | 12/2015 |

OTHER PUBLICATIONS

European Search Report for EP Application No. 17172062.6 dated Oct. 19, 2017.

*Primary Examiner* — Igor Kershteyn
(74) *Attorney, Agent, or Firm* — Carlson, Gaskey & Olds, P.C.

(57) ABSTRACT

A turbine vane for a gas turbine engine includes an outer platform including a first side spaced circumferentially apart from a second side, a forward end and an aft end. The first side includes a first gusset extending between the forward end and the aft end. The first gusset defines a first radius beginning at the forward end that transitions into an elliptical curve toward the aft end. An inner platform is also included. An airfoil extends between the outer platform and the inner platform. A gas turbine engine is also disclosed.

16 Claims, 4 Drawing Sheets

(56) References Cited

U.S. PATENT DOCUMENTS

| | | | |
|---|---|---|---|
| 5,232,340 A * | 8/1993 | Morgan | F01D 9/042 |
| | | | 415/190 |
| 5,333,995 A * | 8/1994 | Jacobs | F01D 5/3092 |
| | | | 415/173.1 |
| 6,343,912 B1 | 2/2002 | Manteiga et al. | |
| 7,025,563 B2 | 4/2006 | Servadio et al. | |
| 7,762,766 B2 | 7/2010 | Shteyman et al. | |
| 8,469,662 B2 | 6/2013 | Lebrun et al. | |
| 8,876,458 B2 | 11/2014 | Thibodeau et al. | |
| 8,939,717 B1 | 1/2015 | Lee et al. | |
| 8,998,575 B2 | 4/2015 | Lucashu et al. | |
| 9,297,312 B2 | 3/2016 | Chuong et al. | |
| 2004/0213673 A1 | 10/2004 | Tsuru et al. | |
| 2015/0369067 A1 | 12/2015 | Pope et al. | |
| 2016/0003070 A1 | 1/2016 | Kastel | |

* cited by examiner

US 10,301,951 B2

TURBINE VANE GUSSET

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

Components in the path of the high-energy gas flow through the turbine section experience high temperatures and pressures. The gas path through the turbine section is typically defined by blade outer air seals proximate a rotating airfoil and static vane stages. Cooling air is supplied to components exposed to the high-energy gas flow. Seals are provided between the blade outer air seals and platforms of the vane stages to contain the cooling air and prevent leakage into the gas path. Seals that are not seated properly or fail to accommodate relative movement between components may enable some cooling air to escape into the gas path and reduce engine efficiency. Moreover, poor sealing can enable high-energy gas flow to leak past the seals, thereby further affecting engine efficiency.

SUMMARY

In a featured embodiment, a turbine vane for a gas turbine engine includes an outer platform including a first side spaced circumferentially apart from a second side, a forward end and an aft end. The first side includes a first gusset extending between the forward end and the aft end. The first gusset defines a first radius beginning at the forward end that transitions into an elliptical curve toward the aft end. An inner platform is also included. An airfoil extends between the outer platform and the inner platform.

In another embodiment according to the previous embodiment, includes a second gusset disposed at the second side.

In another embodiment according to any of the previous embodiments, the first gusset includes a first thickness and the second gusset includes a second thickness that is different than the first thickness.

In another embodiment according to any of the previous embodiments, the forward end includes a forward leg extending transverse to the outer platform and the first radius of the first gusset begins at the forward leg.

In another embodiment according to any of the previous embodiments, includes a mounting hook that extends forward of the forward leg for supporting the turbine vane.

In another embodiment according to any of the previous embodiments, the aft end includes an aft leg extending transverse to the outer platform and the elliptical curve ends at the aft leg.

In another embodiment according to any of the previous embodiments, the first radius is within a range between about 0.375 and 0.425 inches.

In another embodiment according to any of the previous embodiments, the first radius is about 0.400 inches.

In another embodiment according to any of the previous embodiments, the elliptical curve includes a major diameter between about 1.575 and 1.625 inches and a minor axis between about 0.775 and 0.825 inches.

In another embodiment according to any of the previous embodiments, the elliptical curve includes a major diameter of 1.600 inches and a minor diameter of 0.800 inches.

In another embodiment according to any of the previous embodiments, the elliptical curve includes a major axis that is oriented at an angle relative to an engine longitudinal axis between 40 and 50 degrees.

In another embodiment according to any of the previous embodiments, the transition from the forward end to the aft end is between 0.150 and 0.200 inches above an interior surface.

In another embodiment according to any of the previous embodiments, the transition from the forward end to the aft end is 0.175 inches above an interior surface.

In another embodiment according to any of the previous embodiments, the elliptical curve includes a major diameter approximately 4 times the first radius. The elliptical curve includes a minor diameter approximately 2 times the first radius. The elliptical curve includes a major axis that is oriented at an angle relative to an engine longitudinal axis about 45 degrees.

In another embodiment according to any of the previous embodiments, the elliptical curve includes a major diameter approximately 4 times the first radius. The elliptical curve includes a minor diameter approximately 2 times the first radius. The elliptical curve includes a major axis that is oriented at an angle relative to an engine longitudinal axis about 45 degrees.

In another featured embodiment, a gas turbine engine includes a turbine section including a case disposed about an engine centerline axis. A vane is supported within the case. The vane includes an outer platform including a first side spaced circumferentially apart from a second side, a forward end and an aft end. The first side includes a first gusset extending between the forward end and the aft end. The first gusset defines a first radius beginning at the forward end that transitions into an elliptical curve toward the aft end, an inner platform, and an airfoil extending between the outer platform and the inner platform.

In another embodiment according to the previous embodiment, includes a second gusset disposed at the second side. The first gusset includes a first thickness and the second gusset includes a second thickness that is different than the first thickness.

In another embodiment according to any of the previous embodiments, the first radius is within a range between about 0.375 and 0.425 inches.

In another embodiment according to any of the previous embodiments, the elliptical curve includes a major diameter between about 1.575 and 1.625 inches and a minor axis between about 0.775 and 0.825 inches.

In another embodiment according to any of the previous embodiments, the elliptical curve includes a major axis that is oriented at an angle from relative to an engine longitudinal axis between 40 and 50 degrees.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
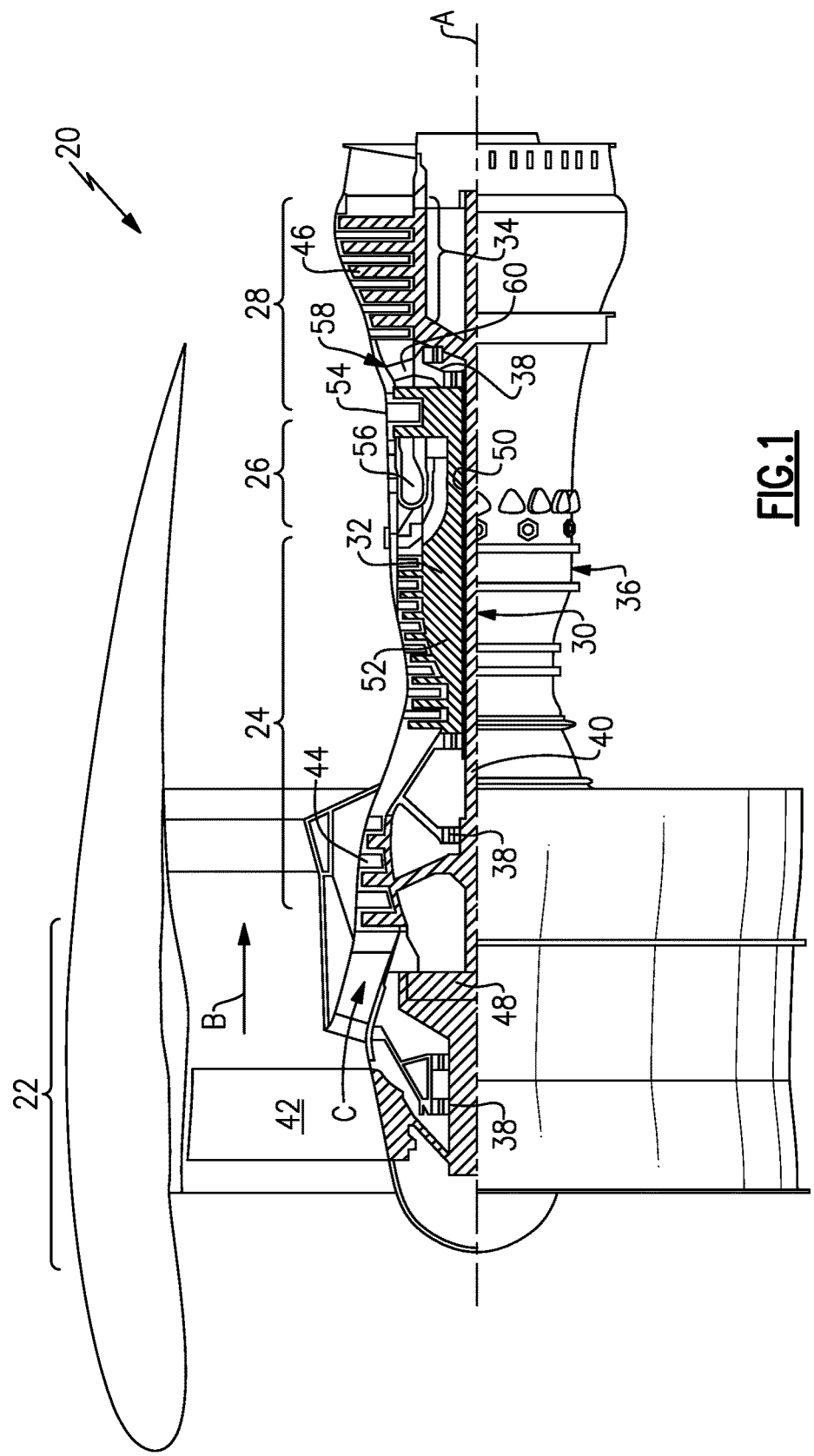
FIG. 1 schematically shows an embodiment of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure turbine require additional cooling air as the overall pressure ratio increases.

Figure 2:
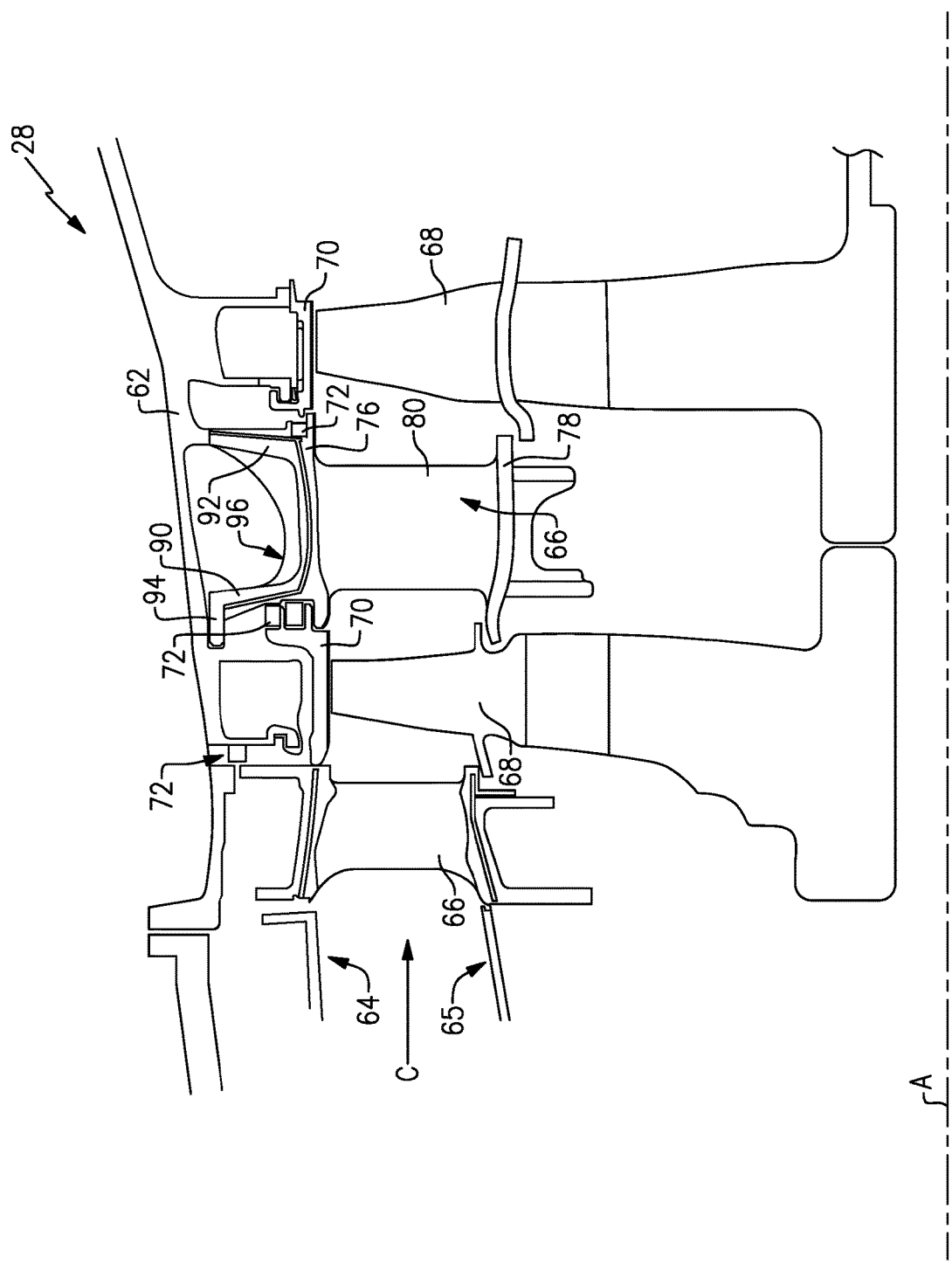
FIG. 2 is a cross section of an embodiment of a turbine section.

Referring to FIG. 2 with continued reference to FIG. 1, the core flow path C through the turbine section 28 is comprised of an outer surface 64 and an inner surface 65 that is defined along several adjacent components. In the disclosed example turbine section 28, the gas path surfaces 64 and 65 are defined by fixed turbine vanes 66 that are interspersed with rotors 68 that rotate about the engine longitudinal axis A. A blade outer air seal (BOAS) 70 is disposed radially outward of each of the rotating airfoils 68 to define the outer surface 64 of the gas path. Seals 72 are provided between the fixed turbine vanes 66 and the BOAS 70.

High-energy exhaust gases flowing through the turbine section 28 can induce axial forces on the static turbine vanes 66 such that some of the seals 72 may be compressed while others are unseated. Seals 72 that are unseated do not contain the cooling air and create an undesired pathway for cooling air to the core flow path C. Some relative movement between the static turbine vane 66 and the BOAS 70 is required and therefore the seals 72 are provided to accommodate this relative movement due to thermal expansion and other operating parameters that occur during engine operation. However, there is a limit to the movement the seals 72 can accommodate and still contain the cooling air.

The example turbine vane 66 includes features to prevent bending and maintain the seals 72 in their desired orientation to provide and contain the cooling air through the turbine section 28. The example turbine vane 66 includes an upper platform 76 and a lower platform 78. An airfoil 80 extends between the upper and lower platforms 76, 78 within the core flow path C. The upper platform 76 includes features that correspond with seals 72 between adjacent BOASs 70. The upper platform 76 includes a forward rail 90 and an aft rail 92. The forward rail 90 includes a hook 94 that engages a portion of a turbine case 62 to support the turbine vane 66. A gusset 96 is provided between the forward rail 90 and the aft rail 92 to maintain the forward and aft rails 90, 92 in position and prevent deformation that can cause misalignment of the seals 72.

Figure 3:
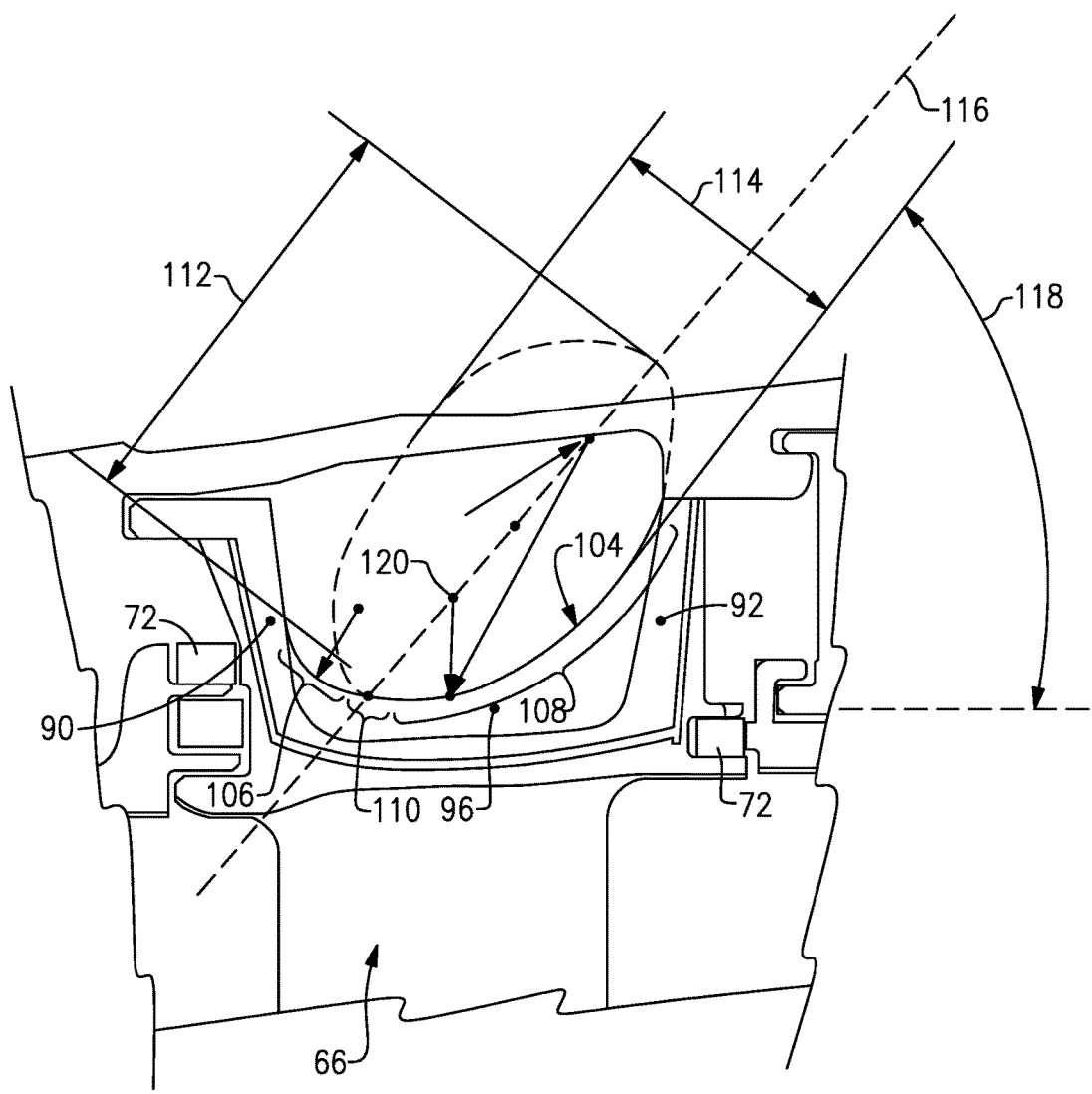
FIG. 3 is an enlarged view of a portion of a turbine vane embodiment.
Figure 4:
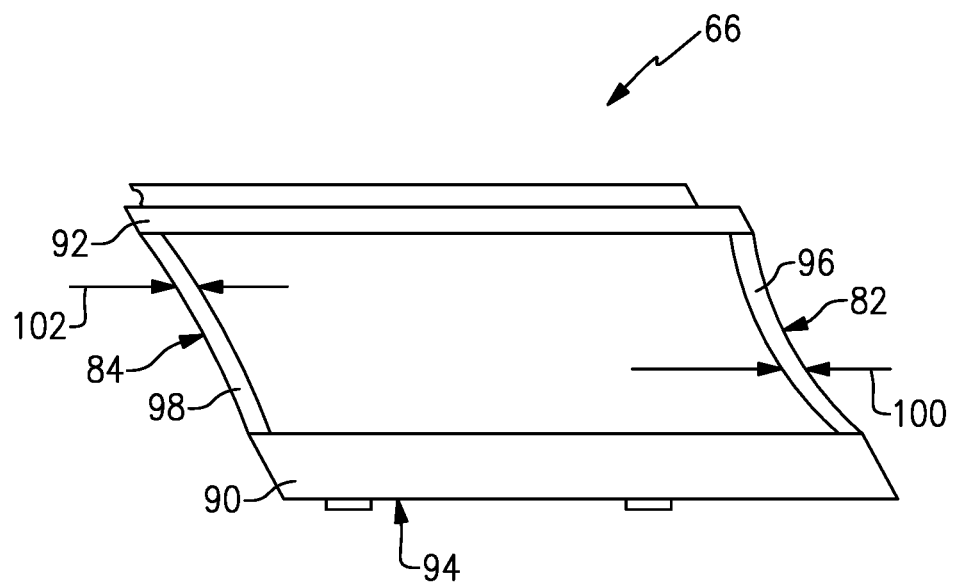
FIG. 4 is a top view of the example turbine vane embodiment.
Figure 5:
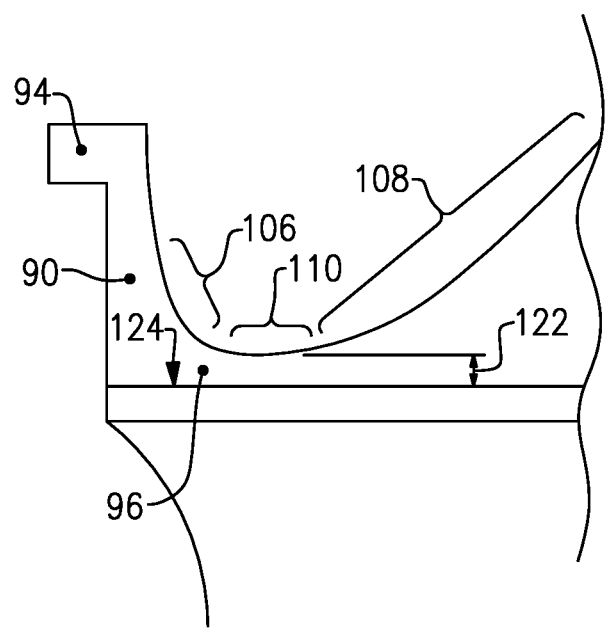
FIG. 5 is a partial view of one side of the example turbine vane embodiment.

Referring to FIGS. 3, 4 and 5 with continued reference to FIG. 2, the example stator turbine vane 66 includes a first side 82 spaced circumferentially apart from a second side 84. The turbine vane 66 also includes the forward rail 90 and the aft rail 92. Extending forward from the forward rail 90 is the hook 94 that engages a portion of the turbine case 62 to hold the turbine vane 66 in a desired orientation.

A first gusset 96 is provided on the first side 82 and a second gusset 98 is provided on the second side 84. The gussets 96, 98 maintain the orientation of the forward rail 90 and the aft rail 92 against the bending forces generated by the high energy exhaust gasses and other loads that are encountered by the stator turbine vane 66 during engine operation.

The first gusset 96 is shown by way of explanation and includes a curvilinear surface 104 that includes a first radius portion 106 followed by a substantially flat or straight portion 110 that transitions into an elliptical curve 108. The second gusset 98 includes a similarly shaped curvilinear surface and therefore the description for the first gusset 96 is also applicable to the second gusset 98.

The shape of the first gusset 96 is defined along the curvilinear surface 104 and includes the elliptical curve 108 that transitions from a portion just forward of the aft rail 92 toward the forward rail 90. The gusset 96 prevents bending of the aft rail 92 to maintain the position of the seals 72.

In this example, the first portion 106 transitions from the forward rail 90 at a simple radius. In one example embodiment, the radius is within a range between 0.375 and 0.425 inches (0.95 cm and 1.08 cm). In another example embodiment, the radius is 0.400 inches (1.02 cm).

The elliptical curve portion 108 is defined by a curved portion of an ellipse having a major diameter 112 that is between about 1.575 and 1.625 inches (3.98 cm and 4.12 cm) and a minor axis 114 between about 0.775 inches and 0.825 inches (1.96 cm and 2.09 cm). The major axis of the ellipse is disposed at an angle 118 relative to a line parallel to the engine axis A. In one example embodiment, the angle 118 is approximately 45 degrees. In another example embodiment, the example angle is between about 40 degrees and 50 degrees.

The elliptical curved portion 108 follows a line that is generated by a curve defined by focal points 120 along the major axis 116. Focal points 120 are part of an ellipse and are disposed along the major axis 116 that is disposed at the angle 118 relative to a line parallel to the engine axis A.

The curved linear elliptical line provided by the gusset 96 prevents bending of the aft rail 90 such that the seals 72 are maintained in their desired orientation and prevent the leakage of cooling air between components.

A flat surface 110 disposed between the radius 106 and the elliptical curve 108 is disposed at a height 122 above an interior surface 124. The interior surface 124 is disposed between the first and second gussets 96, 98. In one example, the height 122 is between about 0.150 inches and 0.200 inches (0.38 cm and 0.51 cm). In another example embodiment, the height 122 is 0.175 inches (0.44 cm).

The example first gusset 96 includes a first thickness 100 and the second gusset 98 includes a second thickness 102. In one disclosed embodiment, the thickness 100 and the thickness 102 are different. In another example embodiment, the first thickness 100 is between about 0.138 inches (0.35 cm) thick and the second thickness 102 is about 0.070 inches (0.18 cm) thick.

Accordingly, the example stator turbine vane 66 includes features for reducing bending moments that can disrupt seals that prevent the leakage of cooling air to the core gas flow path C.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine vane for a gas turbine engine comprising:
an outer platform including a first side spaced circumferentially apart from a second side, a forward end and an aft end, the first side including a first gusset and the second side including a second gusset, the first gusset and the second gusset extending between the forward end and the aft end, the first gusset defining a first radius beginning at the forward end that transitions into an elliptical curve toward the aft end;

an inner platform; and an airfoil extending between the outer platform and the inner platform, wherein the first gusset includes a first thickness and the second gusset includes a second thickness that is different than the first thickness.

2. The turbine vane as recited in claim 1, wherein the forward end includes a forward leg extending transverse to the outer platform and the first radius of the first gusset begins at the forward leg.

3. The turbine vane as recited in claim 2, including a mounting hook that extends forward of the forward leg for supporting the turbine vane.

4. The turbine vane as recited in claim 1, wherein the aft end includes an aft leg extending transverse to the outer platform and the elliptical curve ends at the aft leg.

5. The turbine vane as recited in claim 1, wherein the first radius is within a range between about 0.375 and 0.425 inches.

6. The turbine vane as recited in claim 1, wherein the first radius is about 0.400 inches.

7. The turbine vane as recited in claim 1, wherein the elliptical curve includes a major diameter between about 1.575 and 1.625 inches and a minor axis between about 0.775 and 0.825 inches.

8. The turbine vane as recited in claim 1, wherein the elliptical curve includes a major diameter of 1.600 inches and a minor diameter of 0.800 inches.

9. The turbine vane as recited in claim 1, wherein the elliptical curve includes a major axis that is oriented at an angle relative to an engine longitudinal axis between 40 and 50 degrees.

10. The turbine vane as recited in claim 1, wherein the transition from the forward end to the aft end is between 0.150 and 0.200 inches above an interior surface.

11. The turbine vane as recited in claim 1, wherein the transition from the forward end to the aft end is 0.175 inches above an interior surface.

12. The turbine vane as recited in claim 1, wherein the elliptical curve includes a major diameter approximately 4 times the first radius, wherein the elliptical curve includes a minor diameter approximately 2 times the first radius, and wherein the elliptical curve includes a major axis that is oriented at an angle relative to an engine longitudinal axis about 45 degrees.

13. A gas turbine engine comprising;

a turbine section including a case disposed about an engine centerline axis; and a vane supported within the case, the vane including an outer platform including a first side spaced circumferentially apart from a second side, a forward end and an aft end, the first side including a first gusset and a second gusset extending between the forward end and the aft end, the first gusset defining a first radius beginning at the forward end that transitions into elliptical curve toward the aft end, an inner platform, the second gusset disposed at the second side, and an airfoil extending between the outer platform and the inner platform, wherein the first gusset includes a first thickness and the second gusset includes a second thickness that is different than the first thickness.

14. The gas turbine engine as recited in claim 13, wherein the first radius is within a range between about 0.375 and 0.425 inches.

15. The gas turbine engine as recited in claim 11, wherein the elliptical curve includes a major diameter between about 1.575 and 1.625 inches and a minor axis between about 0.775 and 0.825 inches.

16. The gas turbine engine as recited in claim 13, wherein the elliptical curve includes a major axis that is oriented at an angle from relative to an engine longitudinal axis between 40 and 50 degrees.

* * * * *